Patented Jan. 31, 1933

1,895,764

UNITED STATES PATENT OFFICE

ALWIN MITTASCH, OF MANNHEIM, AND HERMANN ZORN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PROCESS FOR THE PRODUCTION OF CATALYSTS

No Drawing. Application filed June 15, 1931, Serial No. 544,698, and in Germany. June 23, 1930.

The present invention relates to the production of catalysts for use in chemical reactions.

We have found that very valuable catalysts are obtained by thermally decomposing compounds, in the gaseous or vaporous form, which is hereinafter referred to as vaporized form, of such elements from groups 3 to 5 of the periodic system as are capable of forming acids stable and solid at room temperature while contacting these compounds with carrier substances which of course should be inert and which are resistant to heat and preferably of basic nature. By carrier substances resistant to heat are understood those which are changed neither in their chemical composition nor in their shape by the action of the temperatures necessary for decomposing the said compounds. As initial materials for the production of these catalysts come into question in particular those which by the decomposition furnish an element solid at the temperatures at which the catalyst is to be used. As such materials may be mentioned, for example the hydrogen-compounds of metals or of non-metals, as for example the hydrides of arsenic, antimony or bismuth, or in particular of boron, tin or silicon. Further also halogen compounds, such as boron bromide, which are dissociated into halogen and the metal or non-metal respectively by the action of high temperatures, if desired in the presence of reducing agents, such as hydrogen. The said compounds may be employed either alone or in admixture with each other or they may be decomposed on the same carrier one after the other.

Oxidizing agents, such as oxygen are excluded in the said thermal decomposition.

The process according to the present invention may be carried out, for example, by passing the gaseous or vaporous compound to be decomposed either alone or in admixture with an inert or reducing gas, as for example nitrogen or hydrogen through a tube which is filled with a carrier resistant to heat and which is heated to such a temperature that the said compound is decomposed with the deposition of the desired element. As carriers may be employed in particular the oxides of the alkaline earth metals or of the earth metals (inclusive the rare earths) or the salts thereof with weak acids, such as the carbonates, phosphates, borates, silicates or sulphides of these metals; further also minerals, such as asbestos and pumice; or carbon in the form of graphite, active carbon, charcoal or lustrous carbon; or also other solid materials resistant to heat which by themselves have catalytic properties, as for example, in case of the destructive hydrogenation, metals of the 6th group of the periodic system or compounds thereof, such as oxides or sulphides, or, in case of the catalytic oxidation of hydrocarbons to form products containing oxygen, such as aldehydes, rare earth metals, such as cerium, or compounds thereof, or phosphates. These carrier substances may be employed alone or mixed with each other.

The catalysts obtained according to the present invention may be employed for a great variety of catalytic reactions, in particular of conversions of any kind of hydrocarbons, as for example synthetic processes or decompositions, such as cracking, or hydrogenations, oxidations or hydrations. The destructive hydrogenation of carbonaceous materials is carried out with particular advantage according to the present invention in the presence of a catalyst specifically adapted for this reaction, such as metals of the 6th group of the periodic system or compounds thereof, on which, if desired, in admixture with other oxides, such as zinc oxide and magnesium oxide, a metal of group 3 to 5 of the periodic system has been applied in the aforedescribed manner.

The preparation of the catalysts according to the present invention may be carried out at any pressure. In practice ordinary pressures are employed.

The following examples will further illustrate the nature of the present invention, but the invention is not restricted to these examples.

*Example 1*

A mixture of hydrogen and silicon hydrides obtained by decomposing magnesium silicide with dilute hydrochloric acid is passed while excluding oxygen through a quartz tube heated to about 500° C. which is filled with pieces of aluminium oxide having the size of peas. In this manner the hydrides of silicon are decomposed in the heated parts of the tube into silicon and hydrogen. By continuously revolving the tube elementary silicon is deposited uniformly and in very fine division on the aluminium oxide, an extremely active catalyst which may satisfactorily be employed for cracking hydrocarbons, thus being obtained.

*Example 2*

A mixture of hydrogen and boron hydrides obtained by decomposing magnesium boride with dilute hydrochloric acid is passed while excluding oxygen through a quartz tube heated to about 480° C. which is filled with pieces of a mixture of the oxides of magnesium and barium having the size of peas. The boron hydrides are thus decomposed in the hot parts of the tube with the formation of elementary boron and hydrogen. In this manner the said mixture of the oxides of magnesium and barium is coated with a uniform layer of very finely divided boron, the whole being a very reactive catalyst which may be employed with advantage in the conversion of hydrocarbons.

*Example 3*

A mixture of hydrogen and silicon hydrides obtained by decomposing magnesium silicide with dilute hydrochloric acid is passed while excluding oxygen through a tube of chromium nickel steel heated to about 400° C. which is filled with pieces of a mixture of magnesium oxide, zinc oxide and molybdic acid having an average diameter of from 2 to 3 millimeters. The hydrides of silicon are thus decomposed in the hot parts of the tube, and the silicon is deposited in the form of a uniform layer consisting of very small particles. The catalyst obtained is particularly advantageous for use in the destructive hydrogenation of mineral oils.

What we claim is:

1. A process for the production of a catalyst which comprises subjecting a compound, in the vaporized form, of such an element from groups 3 to 5 of the periodic system as is capable of forming an acid stable and solid at room temperature, to thermal decomposition while excluding oxidizing agents and while contacting it with a carrier substance which is resistant to the temperature requisite for said decomposition.

2. A process for the production of a catalyst which comprises subjecting a compound, in the vaporized form, of such an element from groups 3 to 5 of the periodic system as is capable of forming an acid stable and solid at room temperature, to thermal decomposition while excluding oxidizing agents and while contacting the said compound with a carrier substance having a basic nature which is resistant to the temperature requisite for said decomposition.

3. A process for the production of a catalyst which comprises subjecting a compound, in the vaporized form, of such an element from groups 3 to 5 of the periodic system as is capable of forming an acid stable and solid at room temperature, in admixture with an inert gas, to thermal decomposition while excluding oxidizing agents and while contacting the said compound with a carrier substance which is resistant to the temperature requisite for said decomposition.

4. A process for the production of a catalyst which comprises subjecting a compound, in the vaporized form, of such an element from groups 3 to 5 of the periodic system as is capable of forming an acid stable and solid at room temperature, in admixture with hydrogen to thermal decomposition while excluding oxidizing agents and while contacting the said compound with a carrier substance which is resistant to the temperature requisite for said decomposition.

5. A process for the production of a catalyst which comprises subjecting a compound, in the vaporized form, of such an element from groups 3 and 4 of the periodic system as is capable of forming an acid stable and solid at room temperature, to thermal decomposition while excluding oxidizing agents and while contacting it with a carrier substance which is resistant to the temperature requisite for said decomposition.

6. A process for the production of a catalyst which comprises subjecting silicon hydride in admixture with hydrogen to a temperature of about 500° C., while excluding oxidizing agents and while contacting the silicon hydride with aluminium oxide.

7. A process for the production of a catalyst which comprises subjecting boron hydride in admixture with hydrogen to a temperature of about 480° C., while excluding oxidizing agents and while contacting the boron hydride with a mixture of the oxides of magnesium and barium.

8. A process for the production of a catalyst suitable for the destructive hydrogenation of mineral oils which comprises subjecting silicon hydride in admixture with hydrogen to a temperature of about 400° C., while excluding oxidizing agents and while contacting the said silicon hydride with a mixture of magnesium oxide, zinc oxide and molybdic acid.

In testimony whereof we have hereunto set our hands.

ALWIN MITTASCH.
HERMANN ZORN.